United States Patent [19]

Shellhause

[11] 4,070,644

[45] Jan. 24, 1978

[54] FAILURE WARNING SWITCH ACTUATOR WITH AUTOMATIC RESET AND PROPORTIONER OVERRIDE

[75] Inventor: Ronald L. Shellhause, Vandalia, Ohio

[73] Assignee: General Motors Corporation, Detroit, Mich.

[21] Appl. No.: 678,909

[22] Filed: Apr. 21, 1976

[51] Int. Cl.$^2$ .................. B60T 8/26; B60T 11/34; B60T 17/22

[52] U.S. Cl. .................... 340/52 C; 60/534; 188/151 A; 188/349; 200/82 D; 303/6 C

[58] Field of Search ............ 340/52 C, 242; 303/6 C, 303/84 A; 200/82 D; 188/151 A, 349; 137/87; 60/534

[56] References Cited

U.S. PATENT DOCUMENTS

| | | | |
|---|---|---|---|
| 3,480,333 | 11/1964 | Stelzer | 303/6 C |
| 3,674,954 | 7/1972 | Kish et al. | 200/82 D |
| 3,708,211 | 1/1973 | Bueler | 303/6 C |
| 3,712,683 | 1/1973 | Keady et al. | 303/6 C |
| 3,733,106 | 5/1973 | Rike et al. | 303/6 C |
| 3,841,711 | 10/1974 | Stelzer | 303/6 C |
| 3,945,686 | 3/1976 | Orzel | 303/6 C |

Primary Examiner—Donald J. Yusko
Assistant Examiner—Joseph E. Nowicki
Attorney, Agent, or Firm—D. D. McGraw

[57] ABSTRACT

A dual circuit brake system has a failure warning section in which the pressures in each of the circuits are sensed by a pair of pistons having a switch actuating shuttle positioned between the pistons by a pair of springs. The ends of the shuttle are telescoped in the pistons for guidance and relative movement. The switch pistons are relatively small with little travel, minimizing displacement loss. The centering springs do not have sufficient load to force the shuttle to the off position once failure in one system has occurred and the pressure in the remaining system has been released. Repair of the failed system allows pressure actuation to move the shuttle back to the deactuated position for automatic reset. The proportioning valve for the rear brakes is so connected with the failure warning pistons that when the piston exposed to front brake pressure senses a pressure loss while rear brake pressure continues to act on the other piston, a proportioning valve element is moved away from its seat so that no proportioning action on the rear brake pressure can occur.

3 Claims, 3 Drawing Figures

FAILURE WARNING SWITCH ACTUATOR WITH AUTOMATIC RESET AND PROPORTIONER OVERRIDE

The invention relates to a combination valve having a brake failure warning system and a rear brake actuating pressure proportioning system. The valve has a switch actuator arrangement which provides for automatic reset after failure warning action has taken place, repairs have been made, and the brake system is actuated in the normal manner to repressurize both brake circuits of a dual brake system. The invention utilizes the same type of failure warning mechanism disclosed and claimed in application Ser. No. 678,910, now U.S. Pat. No. 4,041,449, issued Aug. 9, 1977 entitled "Failure Warning Switch Actuator with Automatic Reset" and filed on even date herewith. In the preferred form of the invention, when the sensed brake circuit actuating pressures are normally equal, the switch actuator pistons which sense the two brake circuit pressures are of the same diameter and contained in a straight bore section having a common diameter throughout the failure warning section. The proportioning valve assembly includes a proportioning piston having a first area responsive to the rear brake actuating input pressure to the assembly and a second, larger, area responsive to the rear brake actuating pressure which is the output pressure of the assembly and is delivered to the rear brake set. The proportioning piston has a passage therethrough through which brake actuating pressure and fluid is conducted. The end exposed to the input pressure has a valve seat formed thereon. A valve element cooperating with the valve seat to define a proportioning valve is located on a valve stem which moves with the failure warning switch actuator piston exposed to the pressure in the front brake circuit. The valve stem therefore normally is movable relative to the switch actuator piston exposed to pressure in the rear brake circuit. The valve element on the valve stem is axially spaced well away from the valve seat when the assembly is not pressurized. During normal pressurization the switch actuator piston responsive to pressure in the front brake circuit moves the valve stem and the valve element into the position so that the valve seat can cooperate with the valve element for proportioning action. The failure warning switch shuttle is arranged to be precisely positioned axially by plunger 78 when it is in its normal or center position, and the switch actuator piston responsive to front brake actuating pressure is precisely positioned relative to the shuttle due to axial engagement of a ramped portion of the piston with a mating ramp on the shuttle. This establishes the precise axial location of the valve element.

When a pressure loss occurs in the front brake system during brake actuation, the switch actuator pistons and shuttle are moved away from the proportioning piston to close a brake warning circuit, moving the valve stem and its valve element so that full rear brake actuating pressure can be directly delivered to the rear brakes. This is accomplished by an uncorking action of the valve element relative to the valve seat to provide proportioning override. The rear brake actuating pressure continues to be transmitted through the same conduits, chambers and passages as before, but without any proportioning action on it.

If a pressure loss occurs in the rear brake system, the switch actuated pistons and shuttle move rightwardly to close a brake warning circuit and the valve element on the end of the valve stem is held against the valve seat of the proportioning piston so long as the front brake pressure remains applied so that any rear brake input pressure to the assembly is not transmitted through the proportioning piston and out toward the rear brake set. This assists in preventing loss of brake fluid by pumping rear brake fluid to the point of pressure loss, assuming the pressure loss to have occurred between the assembly and the rear brake set. In one modification the proportioning piston has a relatively small axial stroke and a lost motion connection is provided between the valve stem and its valve element. In another modification the valve stem and the valve element are an integral part, and the proportioner piston has a larger stroke to permit other parts of the assembly to move throughout their required ranges of axial movement.

IN THE DRAWINGS

Figure 1:
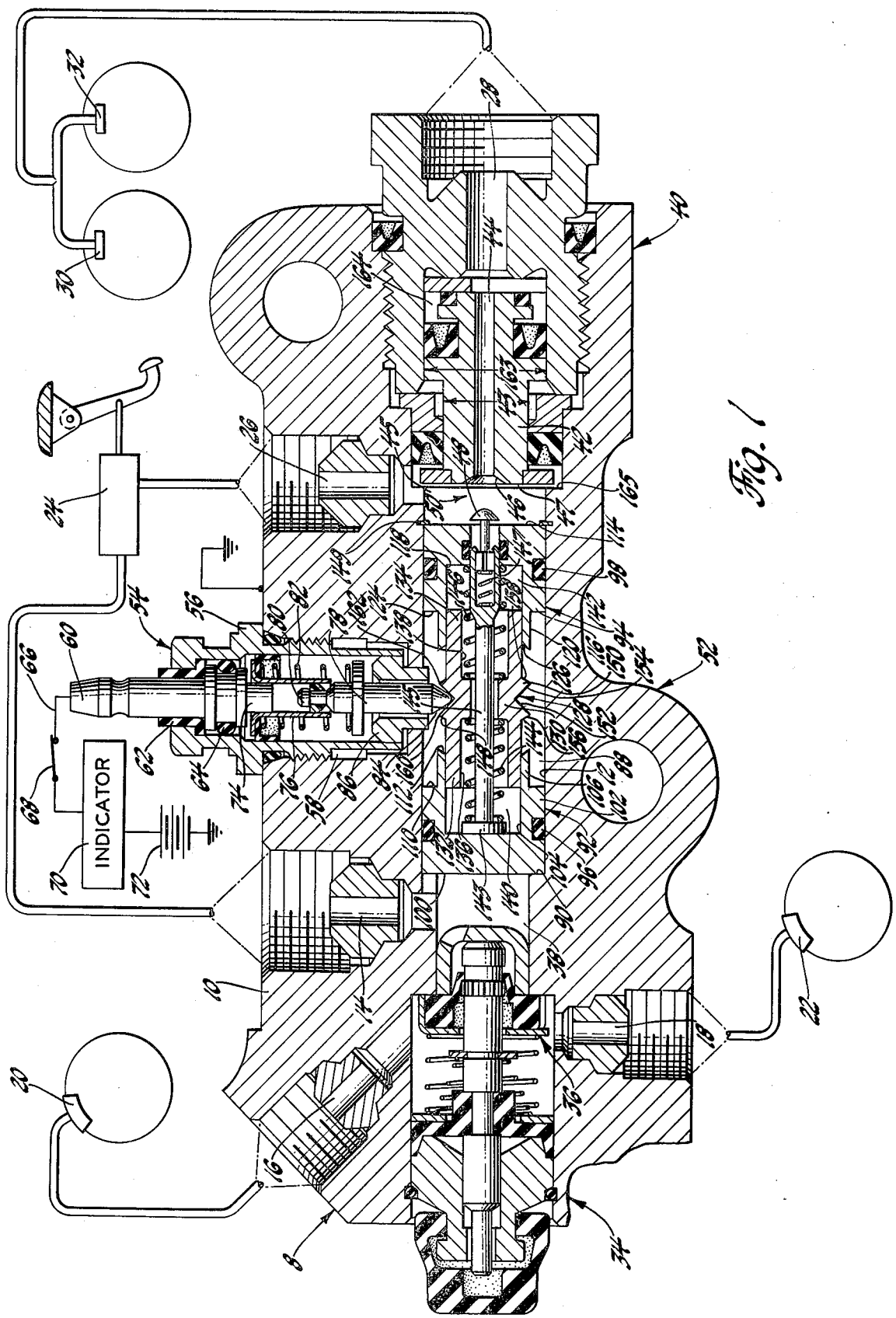
FIG. 1 is a cross-section view of a combination valve assembly having the failure warning switch actuator and proportioning valve override embodying the invention. The Figure includes a schematic illustration of a vehicle brake system.

The assembly 8 includes the mechanism embodying the invention as a part of a conbination valve assembly. It is schematically shown in a dual circuit vehicle braking system. The assembly housing 10 is provided with a through bore 12 having several shoulders thereon and divided into several chambers as will be described. The front brake pressure inlet 14 connects with a left center portion of the bore 12, and outlets 16 and 18 connect with the left end portion of the bore 12. These outlets are connected to the two front disc brakes 20 and 22 of the vehicle. The rear brake pressure from the master cylinder 24 passes through inlet 26, connected to the right center portion of the bore 12, and the outlet 28 at the right end of the bore 12 is connected to the rear brakes 30 and 32.

The left portion 34 of the assembly comprises the metering section, which prevents initial front disc brake pressure buildup until the rear brake shoes contact the drums. The pressure thus held off is then admitted to the front brakes at higher input pressures.

The metering valve 36 functions to delay pressurization of the front disc brakes 20 and 22 until sufficient pressure has been delivered to the rear drum brakes to move the rear brake shoes into contact with their associated brake drums. The metering valve is completely described and claimed in U.S. Pat. No. 3,709,563, and reference may be made to that patent if desired. Since the metering valve does not form a part of the invention herein disclosed and claimed, it is considered sufficient to point out that the brake supply pressure for the front brake circuit enters the housing 10 through inlet 14 and is always present in chamber 38 of bore 12. The pressure is acted upon by the metering valve 36 and is distributed to the front brakes through outlets 16 and 18.

The right portion 40 of the assembly 8 is the portion that has the proportioning valve installed. A closely related proportioning valve is disclosed in the above-noted patent. The proportioning piston 42 is mounted for limited axially reciprocable movement in the right end of bore 12. It has a passage 44 extending axially therethrough with a proportioning valve seat 46 formed at one end 47 and opening into a chamber 45, formed as a part of bore 12. A valve member 48 is positioned to cooperate with valve seat 46 to define the proportioning valve 50. Details of the proportioning valve section and its operation are described below.

The center portion 52 of assembly 8 includes the warning section. A switch assembly 54 has a housing 56 threaded into an appropriate opening 58 in housing 10. A terminal 60 extends outwardly and is electrically separated from housing 56 by an insulator 62 and an "O" ring 64. Terminal 60 is electrically connected in a circuit 66 containing a suitable switch 68, an indicator 70, and a source of electrical energy schematically illustrated as battery 72. Indicator 70 may be a light, bell, or horn, by way of example. The inner end of terminal 60 is formed as a pin 74 around which a metallic collar 76 is received. The collar extends downwardly beyond the end of pin 74. The upper end of a plunger 78 is formed to provide another pin 80 which is slidably mounted in collar 76 but electrically insulated therefrom. A spring 82 acting on plunger 78 normally keeps the pins 74 and 80 separated. When the plunger 78 is moved upwardly, collar 76 electrically engages plunger 78 and the switch contacts are closed. Plunger 78 is electrically connected through housing 56 to ground in order to complete the circuit. The lower end 84 of plunger 78 extends into the center portion of bore 12 through an annular portion 86 of housing 56. Annular housing portion 86 also extends slightly into bore 12, but not so far as does plunger 78.

The center portion 88 of bore 12 is a cylindrical chamber, one end of which is connected to chamber 38 at bore shoulder 90. The other end of the center portion chamber 88 opens into chamber 45. Since the dual circuit brake system is considered to generate substantially equal pressures in both portions of the master cylinder 24 and therefore to deliver substantially equal pressures to chambers 38 and 45, the bore center portion 88 is of the same diameter throughout its axial length. A pair of pistons 92 and 94 are reciprocably mounted in the bore center section 88. Each piston is generally cup-shaped. A seal 96 on piston 92 seals against the wall defining the bore center portion 88, and a similar seal 98 in piston 94 operates in the same manner. Piston 92 has an end wall or head 100 which defines one end of chamber 38. Piston skirt 102 is cylindrically formed to provide a piston recess 104. The annular end 106 of skirt 102 is formed at its outer periphery with a reduced diameter to define a shoulder 110. A ramp 112 provides the end face of skirt end 106. Ramp 112 forms an angle so that the outer peripheral portion of the skirt end extends axially for a greater distance than does the inner peripheral portion thereof.

Piston 94 is similarly constructed, and has an end wall or head 114 which defines one end of chamber 45. Piston skirt 116 is cylindrically formed to provide a piston recess 118. The annular end 120 of skirt 116 is formed at its outer periphery with a reduced diameter to define a shoulder 124. A ramp 126 provides the end face of skirt end 116. Ramp 126 forms an angle so that the outer peripheral portion of the skirt end extends axially for a greater distance than does the inner peripheral portion thereof.

A shuttle 128 is reciprocably received in the center portion 88 of bore 12 between pistons 92 and 94. The shuttle has a center body section 130 and opposed recessed ends 132 and 134. End 132 is telescopically received in recess 104 of piston 92 and end 134 is telescopically received in recess 118 of piston 94. Recesses 136 and 138, respectively provided in ends 132 and 134, cooperate with the piston recesses to define chambers 140 and 142. A compression spring 144 is received in chamber 140 and acts on piston 92 at the bottom of recess 104 through valve member head 143 and on shuttle 128 at the bottom of recess 136. The head 143 is provided on the end of valve stem 145, which extends freely through shuttle 128 and sealingly through piston 94. The other end of valve stem 145 is located in chamber 45 and has valve member 48 mounted thereon. It can be seen that spring 144 will keep head 143 against the bottom of piston recess 104, with the valve stem moving axially with piston 92. Valve member 48 is connected to the main body of valve stem 145 by a lost motion mechanism 147 which normally positions the valve member on the stem but will permit a telescoping movement when the valve stem is moved rightwardly beyond the point where the valve member 48 is seated on valve seat 46. A spring 146, similar to spring 144, is received in chamber 142 and acts on the bottom of piston recess 118 and the bottom of shuttle recess 138. The springs therefore act in opposition on shuttle 128 to urge pistons 92 and 94 axially away from each other while trying to keep the shuttle axially centered between those pistons. When there is no brake pressure in the brake system, the end wall 100 of piston 92 rests against bore shoulder 90 and the end wall 114 of piston 94 rests against stop 149, which may be a snap ring in bore center portion 88 near chamber 45. Shuttle 128 is positioned so that the center body section 130 is normally aligned with switch plunger 78 and engaged by the plunger end 84.

Figure 2:
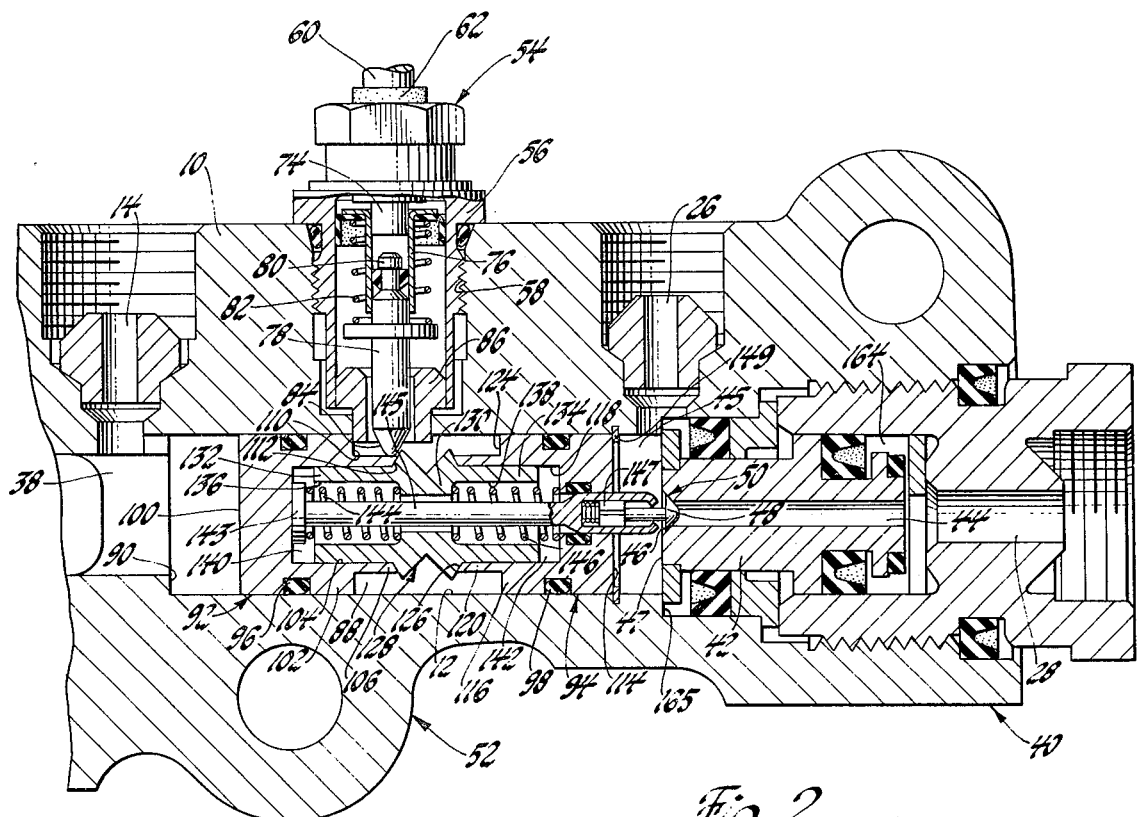
FIG. 2 is a fragmentary cross-section view of the assembly of FIG. 1 showing the assembly actuated with a loss of pressure in one brake circuit.

Shuttle 128 has a pair of axially spaced and circumferentially extending ridges 148 and 150 formed thereon approximately where the shuttle ends 132 and 134 join the shuttle center section 130. The ridges 148 and 150 have their adjacent sides respectively formed as ramps 152 and 154, and their opposite sides formed as ramps 156 and 158. The diameters of the peaks 160 and 162 of ridges 148 and 150 are greater than the diameters of piston recesses 104 and 118, and of slightly greater diameter than the outer surfaces of piston ends 106 and 120. As can be seen in FIG. 2, the ridges extend slightly radially outward relative to these end portions, so that plunger end 84 can pass over a ridge and engage the ridge outer ramp as will be described.

The system is illustrated in FIG. 1 as having the brakes in the released condition of operation. There are therefore no brake pressures in chambers 38 and 46. When the brakes are applied by actuation of master cylinder 24, brake supply pressures are created in the conduits leading from the master cylinder to inlets 14 and 16. These pressures are substantially equal, and act on the equal but opposite areas of piston end walls 100 and 114. When the brake circuits are in good operating order, the pressures increase at substantially concurrent rates, moving pistons 92 and 94 in opposite axial directions of movement toward each other. Since the springs 144 and 146 have the same spring rates, the resistance to such movement is substantially identical. The amount of movement for each piston is therefore approximately the same. With the brake system actuated to a normal brake supply pressure level, pistons 92 and 94 will be moved axially toward each other until their ramps 112 and 126 respectively engage ramps 156 and 158 of ridges 148 and 150. Shuttle 128 will remain substantially centered axially since the opposing forces acting thereon are balanced. Upon brake release, springs 144 and 146 act on pistons 92 and 94 to return them to the position shown in FIG. 1.

If during brake actuation one of the brake circuits cannot be pressurized, the mechanism will function somewhat differently. Assuming the rear brake circuit to have developed a leak so that it cannot be pressurized, there will be no pressure provided in chamber 45 upon brake actuation. Piston 94 will therefore remain in engagement with stop 149, as seen in FIG. 2. The pressure generated in chamber 38 will act as before on piston end wall 100, moving piston 92 rightwardly. The force exerted on piston 92 will act through springs 144 and 156 and shuttle 128 against piston 94. The force is sufficient, at a predetermined pressure differential between chambers 38 and 46, to have the ramp 112 of piston 92 engage ramp 156 of ridge 148 and then force the shuttle 128 rightward, causing plunger end 84 to be cammed upwardly and over the ridge peak 160. The upward movement of plunger 78 will close the contacts of switch assembly 54 and energize the indicator 70. It will remain energized as long as the plunger end does not move back to the center portion 130 of shuttle 128 between ramps 152 and 154. The plunger end will then rest on the outer surface of piston end 106, the piston 92 having been halted in its rightward movement by engagement of its shoulder 110 with the annular portion 86 of switch housing 56. Shuttle 128 will then be moved somewhat further rightwardly by spring 144 until, by the action of springs 144 and 156, it is substantially recentered between pistons 92 and 94 but is axially positioned in a rightward part of bore center portion 88.

When the brake pressure in chamber 38 is reduced as the brakes are being released, piston 92 will be moved leftwardly by spring 144 and the plunger end 84 will move radially inwardly to engage the outer surface of shuttle end 132. This surface is of a sufficient diameter to keep the switch contacts in engagement so that indicator 70 remains energized so long as the switch 68 is closed. The shuttle 128 will also move leftwardly until ridge ramp 156 engages plunger end 84.

Upon repair of the rear brake circuit, followed by actuation of the brake system, pressures which are substantially identical will again be generated in both circuits and exerted in chambers 38 and 46. Piston 94 will move leftwardly while piston 92 will move rightwardly. Ramp 126 of piston 94 will engage ramp 158 of shuttle ridge 150 and force the shuttle leftwardly, camming plunger end 84 upwardly along ridge ramp 156 until the plunger end passes over ridge peak 160 and snaps into position between ridges 148 and 150. The depth between these ridges is such that the plunger 78 moves radially inward relative to shuttle 128 a distance sufficient to open the switch contacts. The mechanism is therefore unlatched and automatically reset upon brake system actuation after the failed circuit has been repaired.

In normal operation of the assembly, the first stages of brake actuating pressure increase act on the proportioning piston and the pistons 92 and 94. The unbalanced areas of the proportioning piston tend to move it leftwardly as pressure in the rear brake circuit increases. Pistons 92 and 94 move inwardly against the forces of springs 144 and 146 until their ramps 112 and 126 respectively engage the shuttle ramps 156 and 158. Rear brake pressure acts on effective areas 43 and 163 of proportioning piston 42, moving that piston leftwardly until it engages shoulder 165. As the brake pressures increase, piston 92 moves valve stem 145 rightwardly until valve member 48 is positioned against valve seat 46. This prevents the rear brake pressure in chamber 45 from passing through passage 44 and into proportioning chamber 164, causing a pressure buildup acting on proportioning piston 42 across the effective area 43 of the piston exposed to chamber 45. No further pressure buildup occurs at this point in chamber 164, outlet 28 and brakes 30 and 32. Piston 42 is therefore moved rightwardly to begin proportioning action between valve seat 46 and valve member 48. This action continues during normal braking actuation at and above the pressure required to position piston 42 and valve member 48 for this purpose. If the rear pressure circuit loses pressure, as above described, piston 92 will move further rightward so that valve member 48 engages valve seat 46 to close passage 44, the lost motion mechanism 147 acting to permit the required movement of valve stem 145. With proportioning valve 50 closed in this manner, there is no brake fluid delivered through outlet 28 to the rear brakes 30 and 32. If the cause of pressure loss was a leak or rupture in a portion of the rear brake system beyond outlet 28, the closing of valve 50 will effectively prevent undue brake fluid loss through that portion of the system. While the valve member 48 will be removed from valve seat 46 when the front brake pressure is released and piston 92 moves leftwardly, it will again engage the valve seat when front brake pressure is reapplied.

Figure 3:
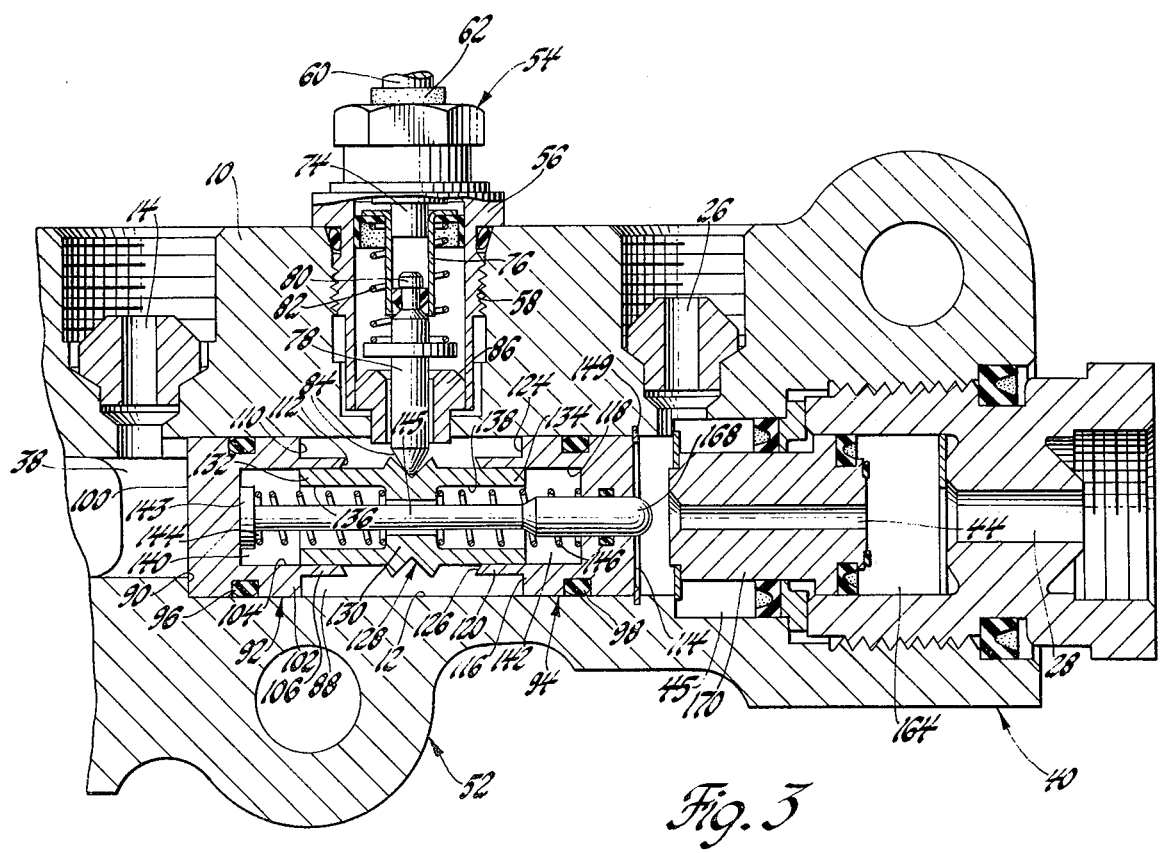
FIG. 3 is a fragmentary cross-section view of a modification of the assembly of FIGS. 1 and 2.

The modification shown in FIG. 3 utilizes a similar valve stem, but no lost motion mechanism. The valve member 168 is formed as an integral part of the valve stem and otherwise operates in the same manner as does valve member 48. In this arrangement the modified proportioning piston 170 is permitted to have a considerably greater axial stroke than proportioning piston 42 in FIGS. 1 and 2. This permits sufficient rightward movement of the valve stem 145 and piston 92 upon a pressure loss in the rear brake circuit so that the warning mechanism can be actuated in a manner similar to that described in relation to FIG. 2.

The assembly provides a simple construction for failure warning indication with automatic reset as compared to constructions which utilize stepped center bore sections with different sized shuttle piston ends and collars for automatic reset purposes. It also adapts its failure warning arrangement to a proportioner override arrangement which automatically operates at any time that the front brake circuit loses pressure while pressure is retained in the rear brake circuit. Should this occur, pistons 92 and 94 move leftwardly in a manner otherwise similar to that described above with regard to FIG. 2. This moves the valve stem 145 leftwardly, moving the valve member 48 or 168 well away from the valve seat 46 so that no proportioning action can take place even though the proportioning piston 42 or 170 moves leftwardly to its maximum extent. This permits full brake actuating pressure to be delivered to the rear brakes so long as there is no front brake circuit pressure.

What is claimed is:

1. A brake pressure sensing and pressure modifying valve assembly for a brake system having first and second brake pressure circuits, said valve assembly having a housing and comprising:

a bore in said housing having first and second oppositely acting and relatively movably pistons therein and means urging said pistons apart, said first piston being adapted to be responsive to pressure in the first circuit of the brake system and said second piston being adapted to be responsive to pressure in the second circuit;

and a proportioning valve in said bore including a proportioning piston movable in said bore, said proportioning valve being adapted to be in the second circuit and to proportion pressure delivered to a brake in that circuit when the pressure in the second circuit delivered to the proportioning valve is above a predetermined value, said proportioning valve having first and second valve elements with said first valve element being operatively movable concurrently with said first piston and said second valve element being a part of said proportioning piston and movable relative to said first valve element during proportioning action;

said first piston being adapted to move relative to said second piston and to act upon pressure loss only in the first circuit, with pressure present in the second circuit, to hold said first valve element out of proportioning relation with said second valve element independently of the pressure in the second circuit.

2. A combination valve assembly for a dual circuit brake system having a front brake pressurizing circuit and a rear brake pressurizing circuit, said valve assembly comprising:

a failure warning section having axially relatively movable first and second pistons with said first piston being responsive to brake pressure in the front brake pressurizing circuit and said second piston being responsive to brake pressure in the rear brake pressurizing circuit, a shuttle member intermediate said pistons and biased toward an axially centered position therebetween, and switch means actuated by a predetermined axial movement of said shuttle member to close an indicating circuit, said shuttle member predetermined axial movement occurring upon a pressure loss in either one of said circuits;

and a rear brake actuating pressure proportioning section having a differential area responsive proportioning piston including an annular valve seat, a proportioning valve element cooperable with said valve seat to define therewith a proportioning valve, and a valve stem having said valve element thereon, said valve stem being operatively attached to said first piston to be axially moved thereby so that said valve element is moved into proportioning position relative to said valve seat at and above a predetermined pressure in both brake circuits, is moved to engage and close said annular valve seat when the brake system is actuated and a pressure loss occurs in said rear brake pressurizing circuit, and is moved axially away from said annular valve seat to override the proportioning action and permit unproportioned rear brake actuating pressure to pass through said assembly when the brake system is actuated and a pressure loss occurs in said front brake pressurizing circuit.

3. In a brake system for a vehicle having front and rear separate brake sub-systems and providing front and rear brake actuating pressures:

brake system pressure loss indicating means for providing a signal in response to a brake actuating pressure loss below a predetermined normal sub-system pressure in either of said brake sub-systems, said indicating means comprising pressure responsive means having a normal condition in response to normal sub-system pressure in said sub-systems and a failure condition in response to said pressure loss in said front sub-system, said pressure responsive means including a bore having a pair of spaced pistons with a shuttle therebetween on which said pistons are piloted and reciprocably movable, a pair of springs each acting on said shuttle and one of said pistons and tending to axially expand the spacing of said pair of pistons, and warning signal control means responsive to a predetermined axial movement of said shuttle to actuate a warning signal, said pistons providing first and second opposed effective areas respectively responsive to the input pressures of said front and rear brake sub-systems in said normal condition of said pressure responsive means to move said pistons substantially equi-distantly axially toward each other against said springs in response to the increasing brake actuating pressures in both said sub-systems so that said shuttle remains substantially unmoved, said pressure responsive means being actuated to said failure condition to cause the predetermined axial movement of said shuttle;

proportioning valve means in series with said rear brake sub-system and in fluid pressure communication with said rear brake actuating input pressure and with said second piston effective area, said proportioning valve means having an annular proportioning piston provided with an annular first valve element and a passage through which brake pressure and fluid are transmitted to a set of vehicle rear brakes, said annular proportioning piston having differential areas respectively responsive to said rear brake actuating input pressure and the brake actuating output pressure transmitted to the set of vehicle rear brakes to move in selectively proportioning relation depending on whether said pressure responsive means is in its normal or failure condition;

and a second valve element in axial alignment with said first valve element and operatively connected with said first piston to be axially moved therewith, said second valve element being axially positioned out of valving relation with said first valve element when said pressure responsive means is in said failure condition and movable with said first piston into a position establishing a valvable relation with said first valve element when said pressure responsive means is in said normal condition, said proportioning piston, in response to said rear brake actuating input pressure and said rear brake actuating output pressure and with said pressure responsive means in said normal condition, moving said first valve element into valving relation with said second valve element to proportion rear brake actuating pressure to said set of rear brakes.

* * * * *

UNITED STATES PATENT OFFICE
CERTIFICATE OF CORRECTION

Patent No. 4,070,644             Dated   January 24, 1978

Inventor(s) Ronald L. Shellhause

It is certified that error appears in the above-identified patent and that said Letters Patent are hereby corrected as shown below:

Column 1, line 44, delete "the" (first occurrence).

Column 2, line 31, "conbination" should read -- combination --.

Column 6, line 67, claim 1, "movably" should read -- movable --.

Signed and Sealed this

Twenty-third Day of May 1978

[SEAL]

Attest:

RUTH C. MASON
Attesting Officer

LUTRELLE F. PARKER
Acting Commissioner of Patents and Trademarks